United States Patent [19]

Toyoda

[11] Patent Number: 5,251,270

[45] Date of Patent: Oct. 5, 1993

[54] MATRIX CALCULATING CIRCUIT

[75] Inventor: Shinjiro Toyoda, Kanagawa, Japan

[73] Assignee: Fuji Xerox Co., Ltd., Tokyo, Japan

[21] Appl. No.: 17,440

[22] Filed: Feb. 12, 1993

Related U.S. Application Data

[63] Continuation of Ser. No. 751,536, Aug. 29, 1991, abandoned.

[30] Foreign Application Priority Data

Aug. 30, 1990 [JP] Japan .................. 2-226512

[51] Int. Cl.$^5$ ............................................. G06K 9/00
[52] U.S. Cl. ........................................ 382/27; 382/41
[58] Field of Search ............. 382/27, 50, 54, 41; 364/724.01, 724.16, 748

[56]  References Cited

U.S. PATENT DOCUMENTS

| | | | |
|---|---|---|---|
| 4,672,463 | 6/1987 | Tomohisa | 382/54 |
| 4,724,544 | 2/1988 | Matsumoto | 382/27 |
| 5,027,423 | 6/1991 | Kawata et al. | 382/27 |

Primary Examiner—Michael T. Hazavi
Assistant Examiner—Yon J. Conso
Attorney, Agent, or Firm—Finnegan, Henderson, Farabow, Garrett & Dunner

[57]  ABSTRACT

A matrix calculating circuit for calculating with respect to a matrix in which all diagonal elements are equal to one another and the remaining elements are equal to one another. The matrix calculating circuit includes a register for successively latching "n" items of data that are time-sequentially inputted thereto, a delay circuit for delaying the data supplied from the register by "n" clocks, a total-sum calculating unit for calculating a total sum of the "n" items of data supplied from the register, a data latch for latching a value of the total-sum calculating unit, and an adder for adding output data of the delay circuit to output data of the data latch. The "n" items of data to be latched by the register may be supplied from an output portion of an image sensor, to remove the influence due to the crosstalk.

6 Claims, 3 Drawing Sheets

MATRIX CALCULATING CIRCUIT

This application is a continuation of application Ser. No. 07/751,536 filed Aug. 29, 1991, now abandoned.

BACKGROUND OF THE INVENTION

The present invention relates to a matrix calculating circuit capable of removing, at a high speed, the adverse effect by an interference among a plurality of data items, if the interference occurs, and to an image sensor using the matrix calculating circuit. More particularly, the invention relates to a matrix calculating circuit capable of calculating, in real time, such a simple matrix relation that in calculating a value from one data item of a data stream consisting of "n" number of data items that are time-sequentially outputted, when the value is influenced by another data item in the data stream, the characteristics of the systems interfering with one another are expressed by the matrix relation, and all the diagonal elements of the matrix relation are equal to one another, and all the remaining elements are also equal to one another.

An example of the case where a plurality of data items interfere with one another is an image sensor of the type in which a number of photodetecting elements are grouped into a plurality of blocks, and those blocks are matrix-driven for each block by switching elements.

This type of the image sensor includes "K" number of linear arrays of blocks consisting of photodetecting elements 3 each being equivalently expressed by the combination of a photo diode 1 and a capacitor 2, as shown in FIG. 3. Light reflects from the image bearing surface of a document according to a density D of an image on the document, hits the photo diodes and causes them to produce photo currents. By the photo currents, image information on the document surface is stored in the capacitors 2 in the form of charge quantity Q. To read the image information, switching elements 4 are closed every block, so that the charge Q is transferred to wiring capacitors 7 of "n" number of common wires 6 coupled with an analog multiplexer 5. Then, the signals derived from a shift register 8 sequentially close switching elements 9. A voltage V varying depending on the charge Q that has been transferred to and stored in the wiring capacitors 7 is picked up time-sequentially. The picked-up signal is passed through an A/D converter 10 where the signal is converted into a digital value of 8 bits, for example, and then the digital value is outputted, as digital image data, onto a signal line 11.

Thus, to read the image information, the density D as the image data is first converted into the charge Q proportional to the density D, and the charge Q is further converted into the voltage V proportional to the charge Q.

The image sensor employs a matrix wiring structure 13. In the wiring structure, the upper and lower wires are arrayed in a matrix, and an insulating layer is interposed therebetween. With such a structure, lead wires 12 led from the photodetecting elements 3 are connected to common wires 6 for each block. Because of the structure, coupling capacitance is caused at each of the cross points of the wires. During the charge transfer, the coupling capacitance seizes the charge, so that the entire charge (image information) stored in the capacitor 2 cannot be transferred to the wiring capacitor 7.

An equivalent circuit of the wire portion of the image sensor, when the coupling capacitances 14 are taken into consideration, may be expressed as shown in FIG. 4. In the circuit, the lead wires 12 and the common wires 6 are laid out so that the coupling capacitances 14 are equal to one another in value.

It is assumed that no coupling capacitance is present between the signal lines consisting of the lead wires 12 and the common wires 6. On this assumption, charge Qi, which is stored in the capacitor 2 of capacitance CP by the photo diode of the i-th photodetecting element of the "n" number of photodetecting elements, is given by the following equation.

$$Qi = CPVi\phi$$

It is assumed that the capacitance of the wiring capacitor 7 is CL when no crosstalk is present. Then, if the switching element 4 is closed, the charge Qi is expressed by the following equation.

$$Qi = CPVi\phi = (CP + CL)Vi$$

where Vi is the output voltage.

The above equation showing the proportional relationship of the charge Qi and the voltage Vi teaches that by reading the voltage Vi, one can ascertain the density D, which is proportional to the charge Q. However, the crosstalk is actually present, and the charge Qi is not proportional to the voltage Vi.

In an actual image sensor, the charge Qi is stored being distributed into the capacitance CP of the i-th capacitor 2, the wiring capacitance CL, and the coupling capacitance Cc present between the wires and the (n−1) number of common signal lines 6. The charge Qi and the output voltage Vi (i=1 to n) satisfy the following matrix relation.

$$\begin{bmatrix} Q1 \\ Q2 \\ Qi \\ Qn \end{bmatrix} = \begin{bmatrix} a & b & b & \ldots & \ldots & b \\ b & a & b & \ldots & \ldots & b \\ b & b & a & \ldots & \ldots & b \\  &  &  & \ldots & \ldots & b \\ b & \ldots & a & b & b \\ b & \ldots & b & a & b \\ b & b & \ldots & b & b & a \end{bmatrix} \begin{bmatrix} V1 \\ V2 \\ Vi \\ Vn \end{bmatrix} \quad (1)$$

$$a = CP + CL + (n-1)Cc$$
$$b = -Cc$$

Accordingly, in order to exactly read the density D, the charge Qi containing the crosstalk component must be calculated from the voltage Vi by using the above matrix relation.

To realize this, a circuit as shown in FIG. 5 has been used. In FIG. 5, the output value Vi (image data) of the A/D converter 10 is outputted through a port 15 to a data bus 16. A CPU 17 fetches the data and stores it to a memory 18. Then, the CPU performs the calculation of the equation (1) under control of a software for the calculation.

However, the calculation of the equation (1) by the CPU 17 under the software control takes much time, hindering high speed read of image data. Use of the CPU 17 and memory 18 increases the device size and hence cost to manufacture the device.

SUMMARY OF THE INVENTION

The present invention has been made in view of the above circumstances and has an object to provide a matrix calculating circuit which can perform in real time the calculation of the equation (1) that is described in software.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

A matrix calculating circuit according to the present invention for calculating with respect to a matrix in which all diagonal elements are equal to one another and the remaining elements are equal to one another, the matrix calculating circuit comprises register means for successively latching a predetermined number or "n" items of data that are time-sequentially inputted thereto, delay means for delaying the data supplied from the register means by "n" clocks, total-sum calculating means for calculating a total sum of the "n" items of data supplied from the register means, data latch means for latching a value of the total-sum calculating means, and adder means for adding output data of the delay means to output data of the data latch means.

In the matrix calculating circuit, while the delay means delays the "n" items of data time-sequentially inputted thereto by "n" clocks, the total-sum calculating means calculates the total sum of the "n" items of data supplied thereto, and the data latch means latches a value of the total-sum calculating means. Further, the adder means adds the output data of the delay means to the output data of the data latch means. Therefore, the matrix calculating circuit can produce correction data at the same speed as that of the input data.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

Preferred embodiments of the invention will be described with reference to the accompanying drawings.

Figure 1:
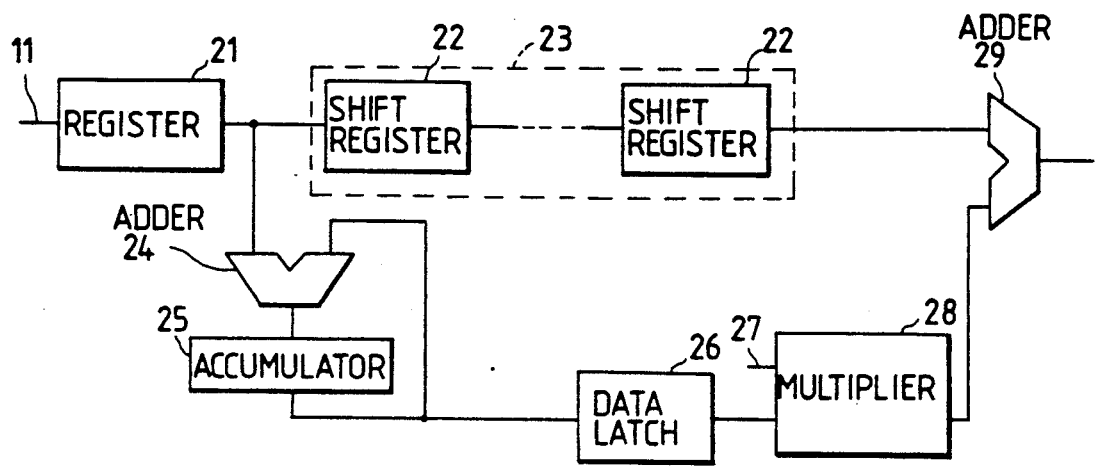
FIG. 1 is a block diagram showing a matrix calculating circuit according to an embodiment of the invention.

In the circuit of FIG. 1, a matrix calculating circuit according to the invention is connected to the output portion of an image sensor (not shown). Namely, a time-sequential signal representative of image data, which contains a density D on a document, is converted into a digital signal by the A/D converter. The digital signal is applied, as digital image data, to a signal line 11. The signal is influenced by the crosstalk.

The charge Qi in which the influence by the crosstalk is removed can be obtained using the above-mentioned equation (1). That is, the charge Qi, which is proportional to the image density D, is expressed by the following equation.

$$Qi = b\,V1 + b\,V2 \ldots + a\,Vi + \ldots + b\,Vn = (a-b)Vi + b\,\Sigma Vj$$

The image data Vi' (corrected data), which is proportional to the charge Qi in which the influence by the crosstalk is removed, is expressed by the following equation.

$$Vi' = Vi + (b/(a-b))\,\Sigma Vj \qquad (2)$$

where $b/(a-b) = -Cc/(CP+CL+n\,Cc)$

Therefore, the coefficient of the total sum $\Sigma Vj$ is a constant that is uniquely determined if a shape of the sensor is determined. The second term "$(b/(a-b))\Sigma Vj$" in the equation (2) is a correction term common to all the Vi' (i=1 to n). Vi' can be obtained by adding Vi to the second term.

A circuit arrangement for calculating the first and second terms in the equation (2) will be described.

The signal line 11 is connected to a register 21, which sequentially latches the time-sequential, digitized image data. As already described, the image data is picked up every block consisting of the predetermined number, or "n" number of photodetecting elements. Accordingly, "n" items of image data form one data group. The data items within the group have been influenced by the crosstalk.

The output data signal from the register 21 is branched and flows through two routes. One route connects to a delay circuit 23 including "n" number of shift registers 22, which delay the image data by "n" clocks, and the other connects to an adder 24.

The output terminal of the adder 24 is connected to an accumulator 25, and the output terminal of the accumulator 25 is connected to the input terminal of the adder 24. The accumulator 25 is also connected to a data latch 26, which retains the total sum of the present image data group while the total sum of the subsequent image data group is calculated.

A value of the accumulator 25 is cleared to "0" before the first data of the image data group is inputted thereto. Subsequently, every time the image data is inputted to the accumulator, it is added by the adder 24. When the final image data Vn is added to the accumulated one, the total sum $\Sigma Vj$ of the image data is latched in the data latch 26. Immediately after the latching operation, the value of the accumulator 25 is cleared to "0" once again, and the accumulator is ready for the calculation of the total sum of the next image data group.

On the other hand, the image data is delayed by "n" clocks by the delay circuit 23. At the instant that the total sum of the image data is latched in the data latch 26, the shift register at the n-th stage outputs the first data $V_1$ of the image data.

The latch 26 is connected to a multiplier 28 which receives the coefficient $b/(a-b)$ at a coefficient input portion 27 thereof. The multiplier 28 calculates the correction term $(b/(a-b))\Sigma V_j$ at the instant that the shift register at the n-th stage outputs the data $V_1$.

The delay circuit 23 and the multiplier 28 are connected to an adder 29 respectively. The adder 29 adds together the correction term $(b/(a-b))\Sigma V_j$ and the data $V_i$, to produce the image data $V_i'$. The operation of the calculating circuit will be described.

The time-sequential image data consisting of the "n" number of data items, which is sent through the signal line 11, is successively latched in the register 21 every data.

The output data of the register 21 travels through the two routes. The data traveling through one of the two routes is used for calculating the correction term $(b/(a-b))\Sigma V_j$ by the combination of the adder 24, accumulator 25, and multiplier 28. To be more specific, a value of the accumulator 25 is cleared to "0" before the first data of the image data is inputted thereto. Subsequently, every time new image data is inputted to the accumulator, it is accumulatively added by the adder 24. When the final image data $V_n$ is added to the accumulated one, the calculation of the total sum $\Sigma V_j$ of the image data has been completed. When the total sum $\Sigma V_j$ is transferred to the data latch 26, the value of the accumulator 25 is simultaneously cleared to "0" again, and the accumulator starts to calculate the total sum of the subsequent image data group. The multiplier 28 multiplies the total sum $\Sigma V_j$ that is retained in the data latch 26 by the coefficient $b/(a-b)$, thereby calculating the correction term $(b/(a-b))\Sigma V_j$.

The image data that is outputted from the register 21 and travels through the other route is delayed by "n" clocks by the delay circuit 23. Accordingly, when the total sum of the image data is latched in the latch 26, the shift register at the n-th stage simultaneously outputs the first data $V_1$ of the image data.

Accordingly, at this time, the correction term $(b/(a-b))\Sigma V_j$ and the data $V_1$ are inputted to the adder 29, which in turn calculates the image data $V_1'$ as follows.

$$V_1' = V_1 + (b/(a-b))\Sigma V_j$$

At the next clock, the shift register at the final stage in the delay circuit 23 outputs image data $V_2$. Therefore, the image data $V_2' = V_2 + (b/(a-b))\Sigma V_j$ is calculated and outputted. Likewise, at the i-th clock, the image data $V_i' = V_i + (b/(a-b))\Sigma V_j$ is calculated and outputted.

Immediately after the calculation of the first image data group consisting of the "n" number of data items is completed, the image data $V_1'$ (corrected data) from the next image data group can be obtained.

The sequence of the calculations is pipelined. Because of this, only the first corrected data of the first image data group is delayed behind the original image data by "n" clocks. However, for the subsequent data, the image data $V_i'$ that is corrected in real time according to the read speed of the input image data, can be obtained.

Figure 2:
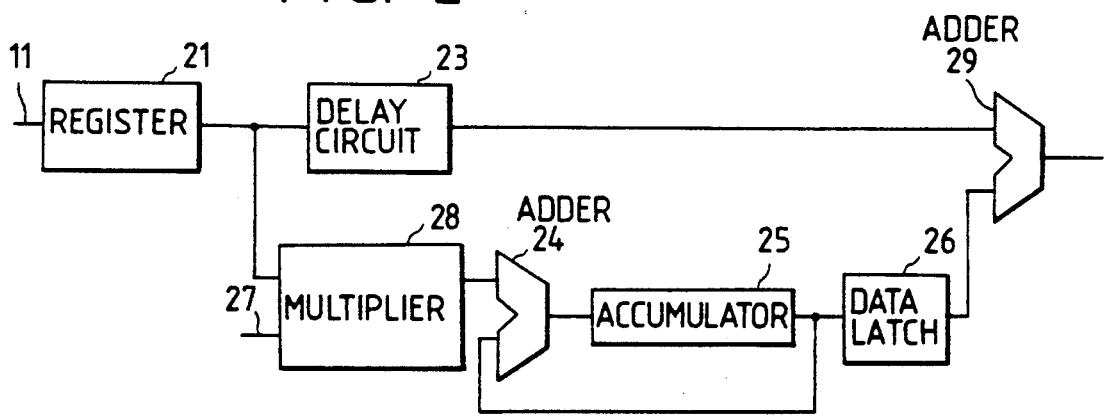
FIG. 2 is a block diagram showing a matrix calculating circuit according to another embodiment of the invention.
Figure 3:
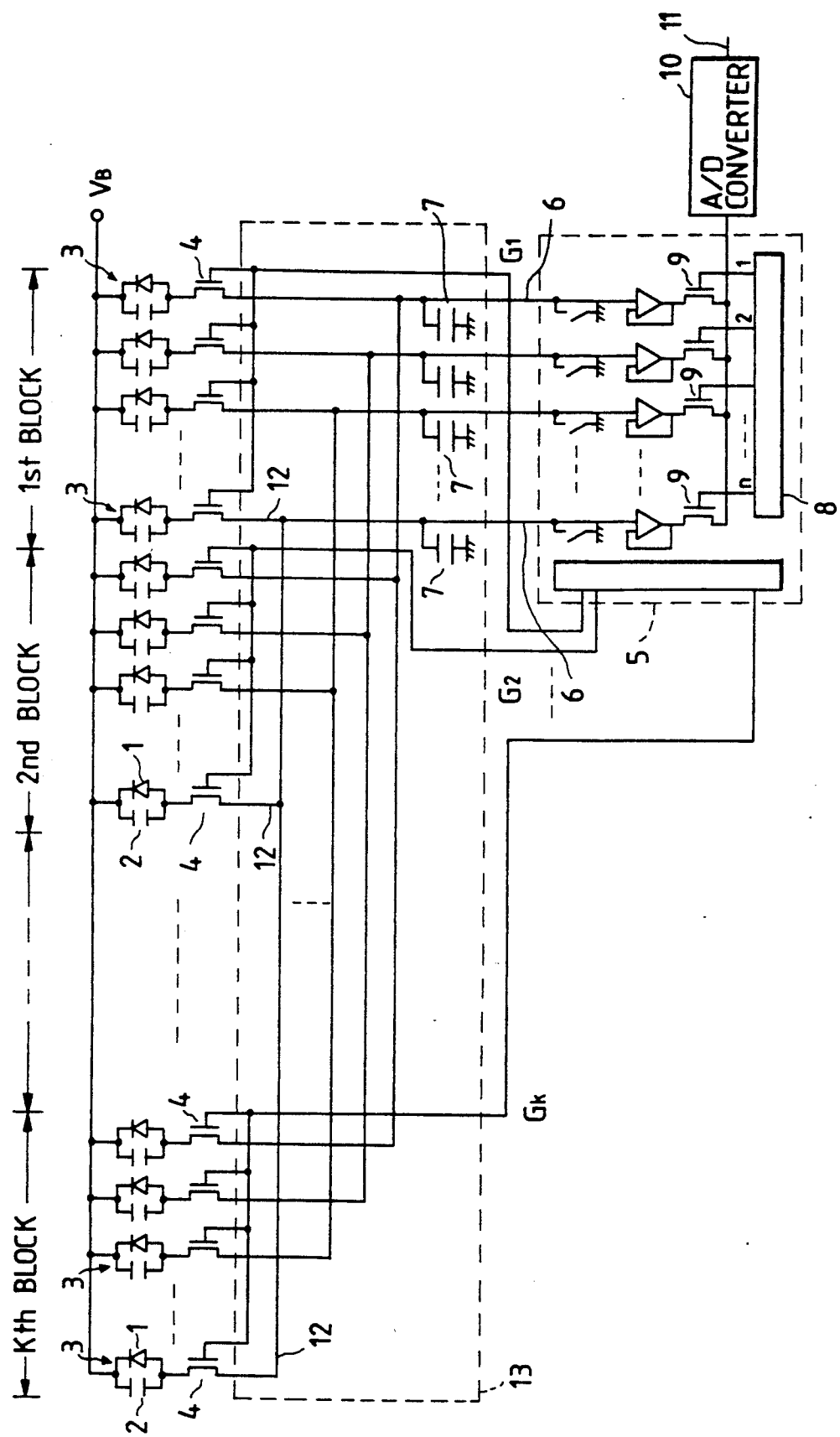
FIG. 3 is an equivalent circuit diagram showing an image sensor of the matrix drive type.
Figure 4:
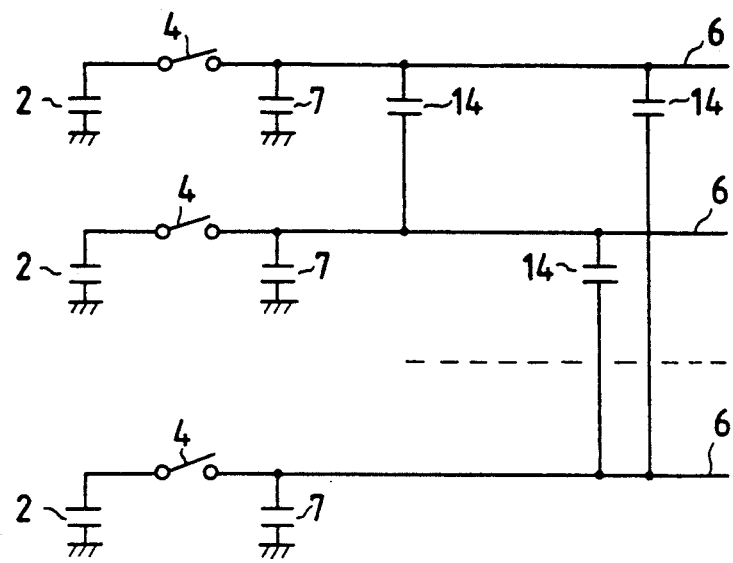
FIG. 4 is an equivalent circuit diagram showing crosstalk among the signal lines in the image sensor of FIG. 3.
Figure 5:
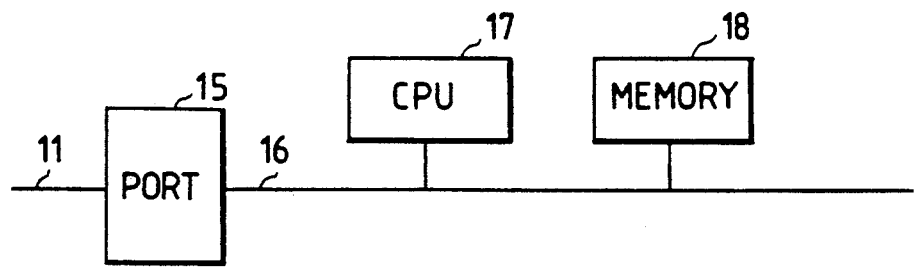
FIG. 5 is a block diagram showing a conventional crosstalk correction circuit in the image sensor.

Turning now to FIG. 2, there is shown a block diagram showing another embodiment of the invention. In FIG. 2, like reference numerals are used for designating like or equivalent portions in FIG. 1.

In the first embodiment, the shift registers 22 constituting "n" stages are used for the delay circuit 23. Where the order "n" of the matrix is large, the number of the shift registers is large, and consequently the circuit scale also would be large. To cope with the possible problem, the second embodiment employs an FIFO (first-in first-out) memory made of a RAM or the like for, example for the delay circuit 23. The FIFO memory requires fewer transistors, leading to the size and cost reduction of the delay circuit 23.

In the instant embodiment, in the calculation of the correction term $(b/(a-b))\Sigma V_j$, the total sum $\Sigma V_j$ is first calculated and then the result is multiplied by the coefficient $b/(a-b)$. Since "n" items of effective bit width Do of the original image data are added, the data having the bit width of $(D_o + \log_2 n)$ possibly appear finally. If the data, which is not rounded or reduced in bit number, is applied to the multiplier 28, a multiplier with the bit width of $(D_o + \log_2 n) \times (b/(a-b))$ must be used. The correction term $(b/(a-b))\Sigma V_j$ is equal to $\Sigma(b/(a-b))V_j$. In some cases, the bit width of the multiplier 28 may be reduced in a manner that $(b/(a-b))V_j$ is first calculated, and then $\Sigma(b/(a-b))V_j$ is calculated. It is determined which of the total sum calculation and the coefficient calculation is first performed, in connection with the number of bits of the multiplexer 28, the adder 24, and the accumulator 25, so as to minimize the circuit scale.

In the embodiments as mentioned above, the conventional image sensor is used for reading images and the correction circuit of the invention is used for the signal processing circuit. Accordingly, the image read device has an excellent tone reproduction and can produce the image data that is free from the influence due to the crosstalk. Where the image read device of which the tone reproduction performance may be comparable with the conventional one is required, if the crosstalk correction circuit of the invention is used, a high precision sensor portion is not required, reducing the size and cost of the resultant sensor.

While the invention was applied to the image read device in the above-mentioned embodiments, it is evident that the invention may be applied for any data processing which may use the correction by a simple matrix, such as the equation (1), in which all the diagonal elements are equal to one another and the remaining elements are also equal to one another. Use of the matrix calculating circuit of the invention enables designers to design high speed and reliable correction circuits.

As seen from the foregoing description, in the matrix calculating circuit of the invention, while the delay means delays "n" items of data time-sequentially inputted thereto by "n" stages, the total-sum calculating means calculates the total sum of the "n" items of data inputted thereto, and the data latch means latches a value of the total-sum calculating means. The output data of the delay means and the output data of the data latch means are added together by the adder means. Therefore, the matrix calculating circuit, with a simple circuit construction, can perform the matrix calculation in real time.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A matrix calculating circuit for calculating a matrix having diagonally dispersed elements on each diagonal line equal to one another and having the remaining elements other than the diagonally dispersed elements equal to one another, said matrix calculating circuit comprising:

register means for successively latching a predetermined number of items of data that are time-sequentially inputted thereto;

delay means for delaying the data supplied from said register means by a number of clock periods equal to said predetermined number;

total-sum calculating means for calculating a total-sum of items of data supplied from said register means upon each of said predetermined number of clocks;

data latch means for latching the total sum of all of said predetermined number of items of data of said total-sum calculating means; and adder means for successively adding the data sequentially supplied from said delay means to output data of said data latch means.

2. A matrix calculating circuit according to claim 1, further comprising coefficient multiplying means for multiplying the output data of said data latch means by a predetermined coefficient; and said adder means successively adding the data sequentially supplied from said delay means to output data of the coefficient multiplying means.

3. A matrix calculating circuit according to claim 1, further comprising coefficient multiplying means for multiplying said predetermined number of items of data supplied from said register means by a predetermined coefficient; and said total-sum calculating means successively calculating a total-sum of the output data of the coefficient multiplying means.

4. A matrix calculating circuit according to claim 1, wherein said delay means includes said predetermined number of shift registers.

5. A matrix calculating circuit according to claim 1, wherein said delay means includes a first-in first-out memory.

6. A matrix calculating circuit according to claim 1, wherein said matrix includes an image sensor having a plurality of groups of photodetecting elements for supplying image data time-sequentially to said register means.

* * * * *